March 31, 1936.  A. FRANKE  2,036,129

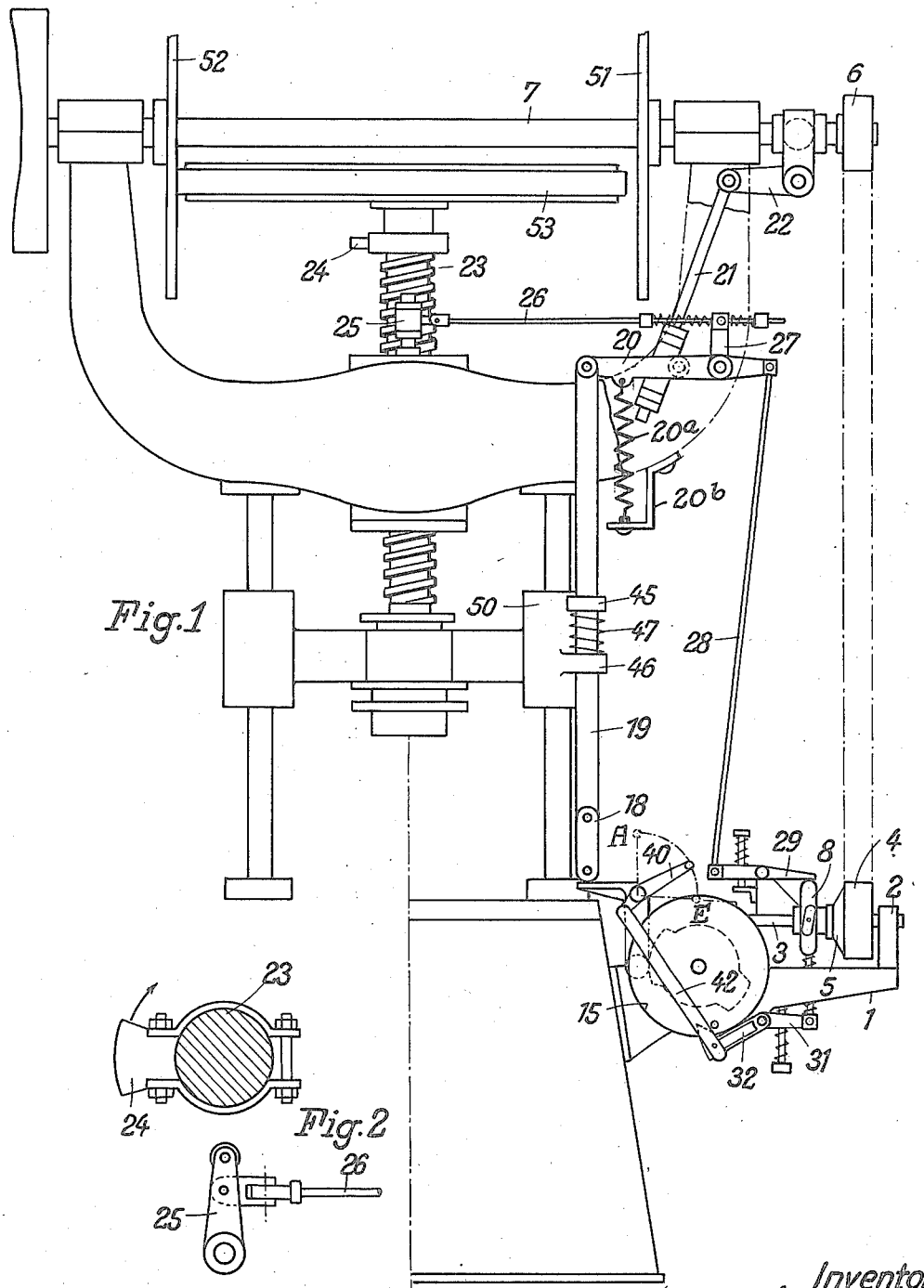

FRICTION WHEEL SPINDLE PRESS FOR PRODUCING CERAMIC TILES

Filed Oct. 4, 1935  2 Sheets-Sheet 2

Inventor:
Alfred Franke,
By Franks. Appleman
attorney

Patented Mar. 31, 1936

2,036,129

UNITED STATES PATENT OFFICE 2,036,129

FRICTION WHEEL SPINDLE PRESS FOR PRODUCING CERAMIC TILES

Alfred Franke, Oberlind, Germany

Application October 4, 1935, Serial No. 43,624
In Germany July 6, 1934

6 Claims. (Cl. 74—202)

This invention relates to friction wheel spindle presses for the production of ceramic tiles in which the pressing operation takes place in four stages, namely the preliminary pressing of the spindle for freeing from air the mass being pressed, for the final pressing and the raising of the press spindle which is effected by a cam disc driven by the friction wheel shaft or in some other suitable manner. As the cooperating friction parts mutually shift, the cam disc is not permanently connected with its drive but, between the driving means and the disc, a coupling device is provided which is controlled from the spindle and, when the spindle is in a certain position, couples the cam disc with its drive.

In the known presses of this type the coupling device is arranged on the shaft which carries the cam disc. This arrangement results in that any irregularities or retardations, which are produced during the transmission of the movement of the press spindle to the coupling device, are transmitted to the same extent upon the cam disc and consequently influence the movement of the press spindle in a corresponding degree.

The object of the invention is, to obtain greater accuracy of the control of the press spindle by the cam disc as regards the coupling of the latter, and this is attained in that the coupling device, instead of being mounted on the same shaft as the cam disc, is arranged on a separate shaft rotating at a particularly high speed and from which the cam disc shaft is driven slowly by a reduction gear with a considerable ratio of reducing transmission. In this manner only a fraction of any irregularity occurring during the starting up of the coupling by means of the spindle becomes apparent during the rotation of the control of the press spindle.

The invention also relates to the arrangement for automatically disengaging the coupling and selectively stopping the pressing operation without interrupting the main drive of the machine.

An embodiment of the invention is illustrated by way of example in the accompanying drawings in which:—

Fig. 1 shows the press in front elevation.

Fig. 2 shows a detail of the drive for engaging the coupling device.

Figure 3:
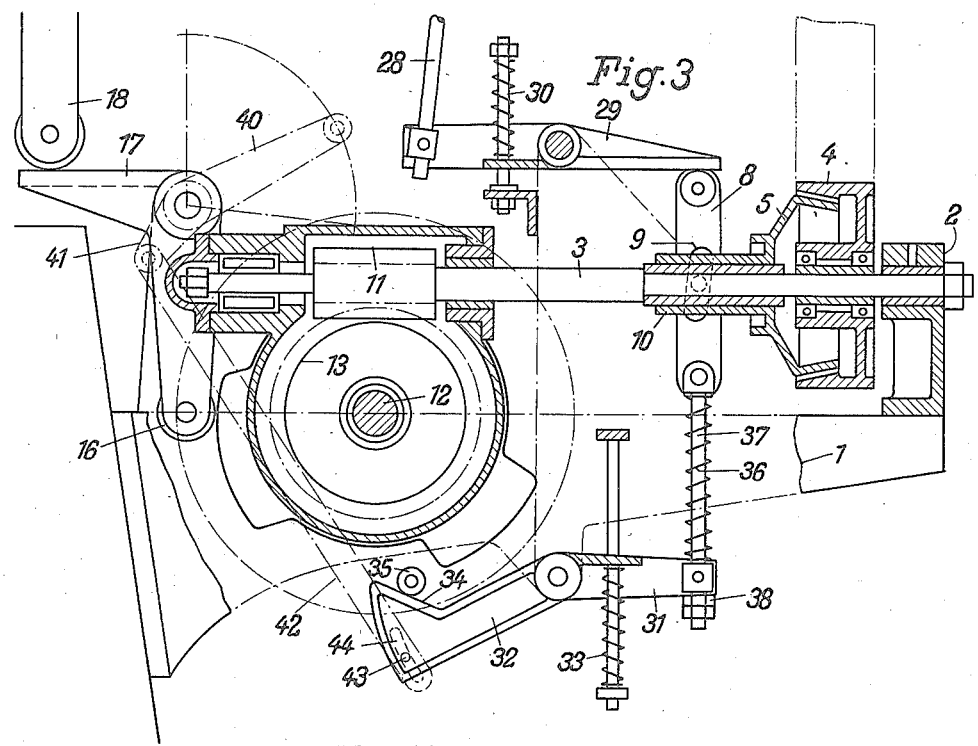
Fig. 3 shows on a larger scale the coupling device with the drive for the cam disc and the control rod.

The driving and controlling devices are arranged on a bracket 1 fixed on the base of the machine. This bracket 1 carries a bearing 2 for the high speed shaft 3 on which the disc 4 of the pair of friction discs 4 and 5 is mounted. The other disc 5 is rotatably connected with the high speed shaft 3, but at the same time axially shiftable, so that it can be brought into and out of engagement with the coupling disc 4, which is driven from the pulley 6 of the friction disc shaft 7 and rotates continually. For shifting the coupling half 5 a pair of bars 8 are provided which are shiftable in vertical direction and have inclined slots 9 in which the pins of a ring engage which is not shown in the drawings, and surrounds the shank 10 of the coupling disc 5.

Figure 4:
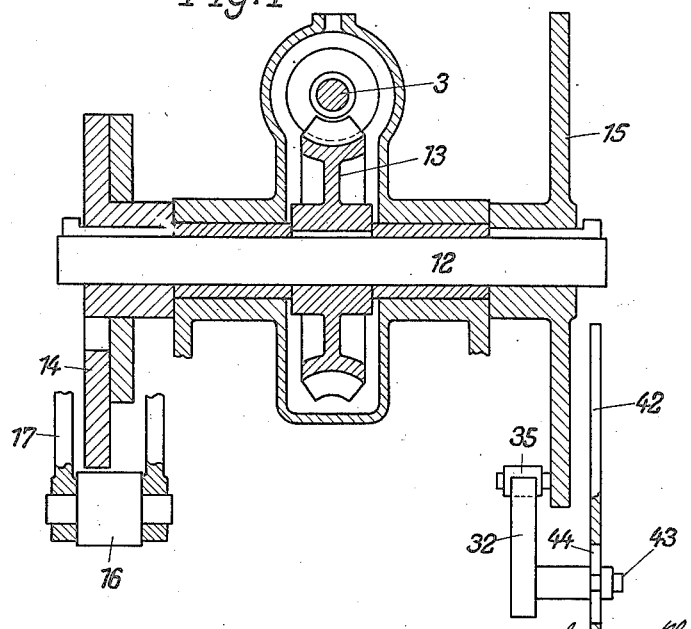
Fig. 4 shows on a still larger scale a cross section along the axle of the cam disc.

The shaft 3 likewise carries a worm 11 which meshes with a worm wheel 13 keyed on a transverse shaft 12, carrying at one end a cam disc 14 and at its other end a control disc 15 (Fig. 4).

The cam disc 14 acts on a roller 16 mounted on one of the arms of a bell-crank lever 17, the other arm of which supports a control rod 19 through the intermediary of links 18. This rod 19 extends upwards to a rocker lever 20 with which a rod 21 is hingedly connected which acts on a bell-crank lever 22, by which the friction disc shaft 7 is reciprocated together with the friction discs.

On a cross-head 50, ascending and descending with the press spindle 23, an abutment 46 is provided which, during the upward movement of the spindle, comes into contact with an adjustable collar 45 on the control rod 19 through the intermediary of a buffer spring 47 shortly before reaching its highest position. Thus, the control rod is raised and the movement of the press spindle reversed.

The control rod 19 presses by gravity and under the action of a spring 20a, having one end connected to the lever 20 and its other end suitably connected to the frame as by a bracket 20b, so heavily on the lever 17 that the friction disc 51, situated on the right and driving in upward direction, always bears against the flywheel 53 when the cams of the control disc 14 are not in contact with the roller 16. As soon as they come into contact therewith the downwardly driving disc 52 is pressed against the flywheel by the shifting of the rod 19.

The engagement of the coupling device 4, 5 is effected by the sector-shaped abutment 24 fixed on the press spindle 23. During the downward screwing of the spindle the abutment 24 (Fig. 2) contacts with the arm 25, shifts this arm through a certain distance and holds it for a certain time in the retracted position. Thus, the rod 26 is shifted towards the left. This causes the bellcrank lever 27 to perform a partial rotation, which in turn causes by means of the rod 28 the two-armed lever 29 to carry out a rocking movement. The free end of this lever bears on the bars 8 which, during the downward movement, shift the coupling half 5 towards the right by means of the oblique slots 9, so that the coupling is closed and the shaft 3 rotated, with the result that the cam disc again commences to rotate and effects the four pressing operations. The two-armed lever 29 is acted upon by a pressure spring 30, which allows it to return into its initial position after the influence of the pull rod 28 has ceased to act.

A pressure spring 36 acts on to the lower end of the pair of bars 8 and is supported at its lower end by the arm 31 of the two-armed lever 31, 32 and tends to move this arm away from the bars 8. The distance between the two bars is, however, restricted by the rod 37 situated within the spring and provided with an abutment 38. The spring 33 pressing from the opposite side on the lever arm 31 has for its object merely to balance the weight of the two guide bars 8 and of the rod 38 with the spring 37 opposite the other arm 32 of the two-armed lever. This arm 32 has an inclined extension 34 which projects within the range of an abutment roller 35 circulating with the control disc 15. As soon as this roller 35 contacts with the inclined surface 34 of the arm 32 it displaces the lever 31, 32 in such a manner that it again shifts the two bars 8 upwards and thus disengages the coupling which is again closed by the next following abutment of the cam 24 against the arm 25, whereupon the operations are repeated.

After the lever 31, 32 has been brought into its disengaging position by the roller 35, the cam disc 14 and the control disc 15 must first perform a part rotation before the lever 31, 32 can be again brought into its engaging position. This is rendered possible by the arrangement of a spring 36 which, during the engagement, is pressed downwards by the lever 29 under the action of the cam 24 on the spindle 23 until the roller 35 of the control disc 15 has entirely left the lever arm 32.

It is often necessary to stop the press spindle without interrupting the main drive of the machine. This is effected by disengaging the coupling in the following manner:—

A hand disengaging lever 40 is arranged, coaxial with the control lever 17, and during the automatic working of the press, is normally standing in its medial position. A rod 42 extends from the shorter arm 41 of this lever and has at its lower extremity a longitudinal slot 44. A pin 43 mounted on the disengaging lever 31, 32 projects into this slot. When the arm is moved upwards into vertical position or into the disengaging position, the rod 42 presses the lever arm 32 downwards and thus raises the two bars 8, the coupling disc 5 being thus separated from the coupling disc 4 so that the control arrangement comes to a standstill.

When the control is to be actuated again, the lever is turned into the engaging position in which it stands almost horizontally towards the right. Thus, the coupling of the discs 4 and 5 is again closed so that the control disc 15 comes into operation. The lever 40 is now brought into its medial position, in which the engagement and disengagement motions or the pressing operations take place automatically.

I claim:—

1. Controlling means for a screw press of the type having a press screw, a friction wheel fixed on the screw, an actuating shaft, and a pair of friction disks engagable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, means urging the clutch shifter to clutch disengaging position, and other means controlled by the movement of the press screw to move the shifter into clutch engaging position against the action of said means.

2. Controlling means for a screw press of the type having a press screw, a friction wheel fixed on the screw, an actuating shaft, and a pair of friction disks engageable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, spring means urging the clutch shifter to clutch disengaging position, and other means controlled by the movement of the press screw to move the shifter into clutch engaging position against the action of said spring means, said last means including a lost motion connection and spring means yieldably centering said lost motion connection.

3. Controlling means for a screw press of the type having a press screw, a friction wheel fixed on the screw, an actuating shaft, and a pair of friction disks engageable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, spring means urging the clutch shifter to clutch disengaging position, and other means controlled by the movement of the press screw to move the shifter into clutch engaging position against the action of said spring means; said last means including a bell crank lever, a rod slidably movable through one arm of the lever and springs yieldingly holding said rod against said sliding movement.

4. Controlling means for a screw press of the type having a press screw, a friction wheel fixed on the screw, an actuating shaft, and a pair of friction disks engageable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, spring means urging the clutch shifter to clutch disengaging position, other means controlled by the movement of the press screw to move the shifter into clutch engaging position against the action of said spring means, manually operable means for moving the clutch shifter into clutch engaging position, and means controlled by the rotation of the driving shaft and operating to cause the manually operable means to move the clutch shifter out of clutch engaging position.

5. Controlling means for a screw press of the type having a press screw, a friction wheel fixed on the screw, an actuating shaft, and a pair of friction disks engageable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, spring means urging the clutch shifter to clutch disengaging position, other means controlled by the movement of the press screw to move the shifter into clutch engaging position against the action of said spring means, said last means including a lost motion connection and spring means yieldably centering said lost motion connection, manually operable means for moving the clutch shifter into clutch engaging position, and means controlled by the rotation of the driving shaft and operating to cause the manually operable means to move the clutch shifter out of clutch engaging position.

6. Controlling means for a screw press of the type having a press screw, a friction wheel fixed on the screw, an actuating shaft, and a pair of friction disks engageable with the wheel periphery at opposite points, the actuating shaft being longitudinally shiftable to cause selective engagement of the disks with the wheel; said controlling means comprising a driving shaft, a clutch member revoluble on said driving shaft and driven from the actuating shaft, a second clutch member slidably keyed on the driving shaft to engage with and disengage from the first clutch member, a clutch shifter connected to the second clutch member to move the latter, a driven shaft, a speed reducing gear connecting the driving and driven shafts, a cam on said driven shaft, means to shift the actuating shaft longitudinally and actuated by the rotation of said cam, spring means urging the clutch shifter to clutch disengaging position, other means controlled by the movement of the press screw to move the shifter into clutch engaging position against the action of said spring means, said last means including a bell crank lever, a rod slidably movable through one arm of the lever and springs yieldingly holding said rod against said sliding movement, manually operable means for moving the clutch shifter into clutch engaging position, and means controlled by the rotation of the driving shaft and operating to cause the manually operable means to move the clutch shifter out of clutch engaging position.

ALFRED FRANKE.